Oct. 20, 1970           L. KULL           3,534,905

MENSTRUAL CYCLE INDICATING DEVICE

Filed July 3, 1968

INVENTOR.

Leo Kull

United States Patent Office 3,534,905
Patented Oct. 20, 1970

3,534,905
MENSTRUAL CYCLE INDICATING DEVICE
Leo Kull, 58 Westover Ave., West Caldwell, N.J. 07006
Filed July 3, 1968, Ser. No. 742,262
Int. Cl. G06c 3/00
U.S. Cl. 235—88
2 Claims

ABSTRACT OF THE DISCLOSURE

A menstrual cycle indicating device in the form of a group of coaxial disks mounted for rotatable relation to each other and identified as a month, a week, a cycle and a disk segment respectively; relative rotation of the disks serving to relate the coming events within a menstrual cycle such that when a setting is made on the first day of menstruation the ovulation period and the start of the next menstruation are automatically related to the coming days of the month and week, provision being made for adjustment of the cycle duration to plus or minus a few days of the conventional 28-day period.

---

This invention relates to a menstrual cycle indicating device and is intended to relate certain events periods of the menstrual cycle of a human female to the Gregorian calendar.

It is a known fact that less than a third of a menstrual cycle is a fertile period which has a certain relation to the menstrual cycle and various methods and means have been proposed to determine the fertile period of a woman for a planned parenthood purpose. However, so far as I am aware, none of the methods and devices heretofore proposed have the simplicity or convenience which should justify a wide acceptance of such devices by the general public.

Basically, menstrual cycle indicating devices consist of a media bearing the information regarding the events of a woman's menstrual cycle relatable to our calendar system. The arrangement makes it possible to know exactly on which days the events of a menstrual cycle will occur on a predictable basis. In a preferred form of the invention, a cycle disk could be used and marked to suit a known length of a woman's menstrual cycle or provision can be made for adjusting the length of the cycle if a second member is added to the cycle disk.

A major difficulty exists in relating the menstrual cycle to our calendar system and particularly, the problem encountered is the varying length of the month in our calendar system. The existing answer to this problem lead to few basically different solutions which require extra large time scales accompanied by reading and adjustment complexities. A known attempt to use a 31-day division base lacks completely an answer to the short month problem.

It is believed that a 31-day time base is adequately long to cover most of the menstrual cycle length and it would be desirable to stay within a framework of a 31-day time base which offers the advantages of a small size and comparative simplicity to accomplish this. I add a weekday scale to provide a novel means for adjusting for a shorter month than 31 days. The theory is that a weekday scale with a starting point and end point fitted to the same 31 division base as the month scale and with an overlap of 7 weekdays on the end of weekday markings can be used to relate the start and end of any menstrual cycle to 31 days to proper weekdays throughout the cycle. Such a relationship alone would not be adequate because the 7-day weekday cycle repeats itself about 4 times within a menstrual cycle. The addition of a simple 31-day scale makes the system complete. In fact, this provides a monthly calendar scale where both the weekday and day of the month indicia are clearly readable in a simple way that everyone's eye is used to see them. The presence of a week disk makes the need of a short month adjustment also visible, since after a short month the next weekday has to be the first of a new month requiring skipping of the 31st day. This makes the required adjustment easily visible on the time scale and rather self explanatory even for the month of February which requires a 2- or 3-day adjustment. Another advantage of the present invention is that the weekday disks remains always properly related to the cycle disk and if a short month adjustment is not done exactly on the first day of the new month or is even forgotten, the weekday relationship to the menstrual cycle is sufficient to get a proper readout because a one day error on the month disk would not create any confusion which is the current week within a month.

Thus the addition of the weekday disks serves a very important function to provide a simple satisfactory time scale. It cannot stand alone, it has to be supported by the day of month scale, but the latter in turn needs the help of the weekday disk for making the need of a short month adjustment visible. Applying now this double time scale to read out events marked to a concentric cycle disk, it is easy to see that the arrangement forms an unseparable threesome. The flexibility of this can be further extended by the addition of another member on the cycle disk in order to provide an adjustment for various cycle length.

This novel treatment of time scale further requires a limit stop arrangement up to 6 increments which insures that a starting point in the menstrual cycle scale can be related to any of the 7 weekdays only at the beginning of the weekday scale.

Accordingly, the primary object of the present invention is to provide a small, compact, indicating device which can be conveniently carried in a pocket or purse and which is relatively simple in its construction and setting to avoid complicated setting instructions for its use.

A further object of the invention is to provide a device of the class described which permits a simple short-month adjustment without extraneous or supplemental means or hard-to-follow instructions.

A still further object of the invention is to automatically indicate the start of a succeeding menstrual cycle as well as to check the regularity of such cycle.

The construction and operation of the device will be better understood from the detailed description which follows when considered in connection with the accompanying drawing wherein.

Figure 1:
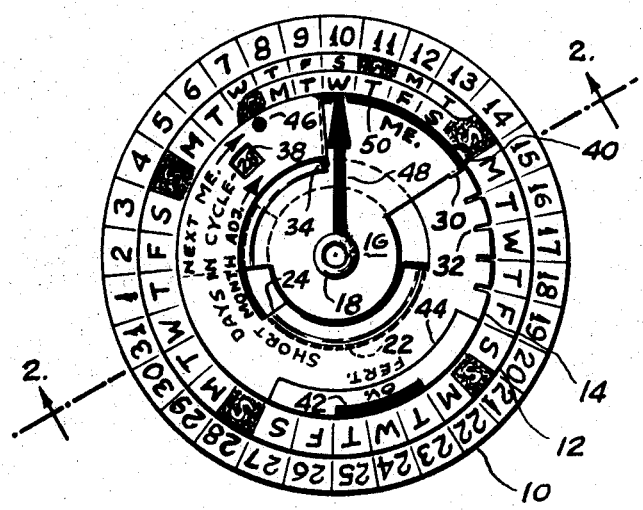
FIG. 1 is a top plan or face view of the device.
Figure 2:
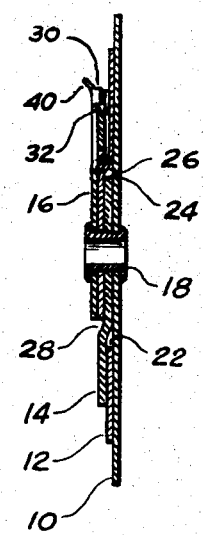
FIG. 2 is a cross section taken along the line 2—2 of FIG. 1.

Referring to the drawing, the device may be said to consist of three concentric disks 10, 12 and 14 and a disk segment element 16 of successively-reduced diameters, each of which has a center hole for mounting rotatably on an assembly eyelet 18. The largest disk 10 may be referred to as the month disk which is divided peripherally into 31 equal spaces having consecutive markings from 1–31 which represent the maximum number of days in a month. The disk 12 may be referred to as the week disk and is also divided peripherally into 31 equal spacings in which the successive days of the week abbreviations are indicated and with a seven-day arcuate overlap at 20, the purpose for which will be described later. The disk 14 which may be referred to as the menstrual cycle disk and the disk segment 16 are provided with markings and/or legends to indicate various periods within a menstrual cycle.

The pair of disks 12 and 14 is provided with coaxial identical semicircular slots 22 and 24, respectively, each slot covering three basic spaces more than 180°. The central portion of the disk partly bounded by the slit 22 is offset outwardly at 26 slightly less than the thickness of the material from which it is made while the central portion of the disk 14 is similarly offset rearwardly at 28. The arrangement permits the central portion of disk 12 to be inserted through the slot 24 to provide a frictional holding engagement between said disks and a rotational freedom therebetween up to six basic spaces of the disk 12.

Figure 3:
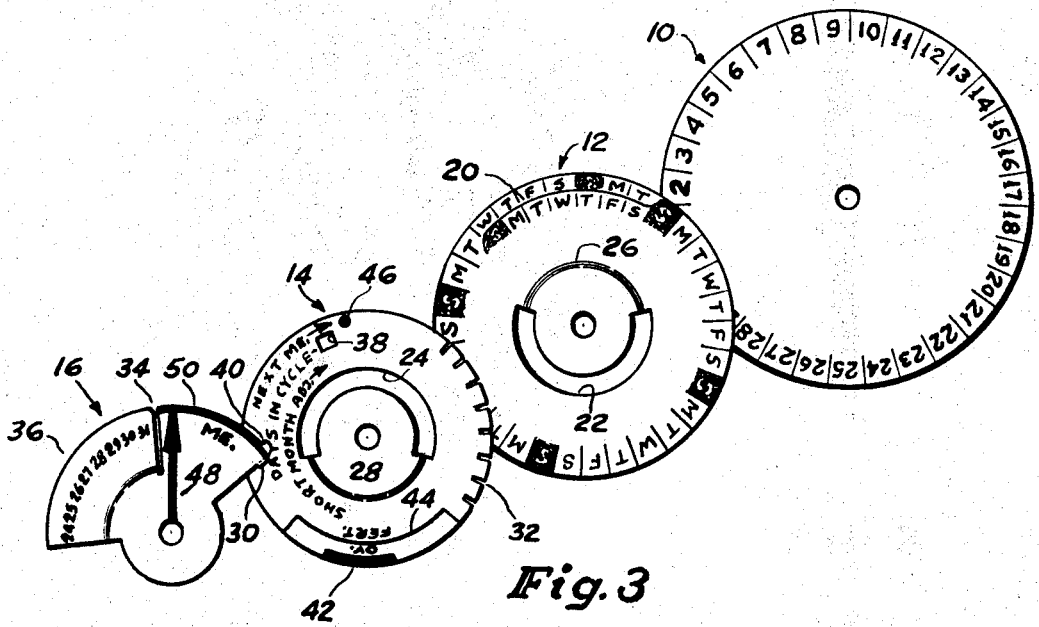
FIG. 3 is an exploded view of the four component elements of the device.

Disk 14 and disk segment 16 are provided with non-slipping indexing means up to eight basic spaces and as shown on FIG. 3 such indexing is accomplished by segment 16 being formed with a small bent-over portion or tab 30 which can be received within any of eight indexing slots 32 formed in the periphery of disk 14. Disk segment 16 is formed with a radial slot 34 and a rearwardly offset sector 36 which is provided with menstrual periodicity markings 24–31. When sector 36 is inserted through the slot 24 in disk 14 and tab 30 engages in one of the slots 32, one of the numerals on sector 36 will appear through a window opening 38 in disk. A tab 40 bent slightly upward is formed on segment 16 to facilitate the indexing setting.

With the four members 10, 12, 14 and 16 assembled on the eyelet 18 as shown in FIG. 1, the arrangement provides complete rotational freedom to disk 10 with a slight frictional holding thereof against rear face of disk 12, a six-space rotational freedom between the pairs of disks 12 and 14, and a non-slip indexing between disk 14 and segment 16. The pair of disks 10 and 12 act as a rotary calendar whereby the days of the month can be set to register with the proper days of the week. The disk 14 has indicia and legends to release the fixed relationship of the ovulation period 42 and the start of the following menstrual cycle indicated by a dot 46 which relationship the medical profession has established to be 15 days from the first day of ovulation. An extended fertile period is indicated at 44. Since the length of the menstrual cycle can be different in various individuals, the time period from the start of the menstrual cycle to the ovulation. An extended fertile period is indicated at 44. Since the length of the menstrual cycle can be different in various individuals, the time period from the start of the menstrual cycle to the ovulation is a variable and is determined by the length of the cycle. Segment 16 is provided as an adjusting means for the aforemention variable and has an arrow or pointer 48 and a five-day duration sector 50 marked with provision for adjusting said sector 50 in relation to ovulation period 42 on disk 14. FIG. 1 shows the most common 28-day menstrual cycle with numeral 28 appearing through window 38. If this cycle is shorter, say 26 days, segment 16 will be adjusted clockwise two spaces which in turn will make numeral 26 on segment 36 appear through the window 38 and as a result it will cut down the 13-day interval of the 28-day cycle between the start of the cycle and ovulation to 11 days. This length of cycle adjustment is an initial setting only and therefore tab 30 and slots 32 serve to lock said setting against any accidental shifting. Only if the length of the cycle repeatedly does not agree with the numeral appearing through the window 38 is there a need to readjust the length of the cycle.

OPERATION

The setting of the device for a long month (31 days) is simple. The setting is done on the first day of menstruation which marks the start of a cycle. The setting itself consists of merely adjusting the arrow 48 to point the day of the week and month on disks 10 and 12 on that particular day. The ovulation time 42 with fertile period 44 and the dot 46 indicating the start of the next menstruation are now automatically related to proper days of the month and week so they can be used for family planning purposes. The presence of the week disk 12 helps to simplify the confusing short-months (February, April, June, September and November) adjustment. The fact that arrow 48 can only be set at the start of the weekday markings, insures that throughout the cycle the proper weekdays are always indicated regardless if there is a short or long month. The purpose of the weekly overlap 20 becomes apparent now. The setting of FIG. 1 shows that the cycle starts on Wednesday, the 10th of the month, and the next menstruation also start on Wednesday (first overlap day). But if for instance the cycle starts on Saturday the next menstruation also starts on Saturday which is now the fourth overlap day. It can be seen now that the maximum possible cycle length of 31 days necessitates the addition of three more overlap days in order to make the next menstruation day readable on the extreme end of the cycle.

From this it follows that 7 overlap days are required for a 31-day menstrural cycle length and the extent of the limit stop arrangement on disks 12 and 14 must provide a 6-increment freedom in order to be able to set the pointer 48 to select any of the 7 weekdays as the starting day at the beginning of the weekday indicia. If the cycle disks 14 and 16 are manufactured as a single unit for a fixed cycle length as an alternative and the used cycle length is shorter than 31 days, less overlap of weekdays is required and for a 24-day cycle length there are no overlap days required at all on the weekday disk 12.

The presence of the weekday disk 12 makes the problem of varying length of month quite simple. Thus one can readily see that in the case of a long month (31 days) there is a normal transition without the need for adjusting the month disk 10. If however menstruation starts in a 30-day month, the last day of the month will fall on Tuesday although Wednesday should be the first day of the next month. Hence, adjustment by movement of the week disk 12 one day in a clockwise direction is now obvious without the need for special instructions. The confusing February (28 days) works the same way, e.g., in FIG. 1 Sunday is the 28th or last day of the month and to make Monday the first day of the next month a three-day adjustment of disk 12 in a clockwise direction is required. The frictional engagement between disks 12 and 14 helps to maintain their setting while this adjustment is performed. Even if the short-month adjustment was forgotten on the first day of the month inaccuracy between the day of the week and month serves as a remainder for a short-month adjustment whenever the device is used to check the periods of the cycle.

The device may be manufactured from sheet metal or relatively rigid plastic materials and the markings thereon may be multicolor to distinguish Sunday and the fertile period or said markings may be performed by a negative printing technique.

While I have shown and described a preferred embodiment of my invention, it is to be understood that variations in the details of construction may be resorted to without departing from the spirit of the invention as defined in the following claims.

What I claim is:

1. A menstrual cycle indicating device comprising a series of disks mounted in a coaxial rotatable adjustable relation to each other, said disks being referred to as month, week, and menstrual cycle disks having equally spaced circumferential indicia related to a 31-division base, said month disk indicia being in consecutive day-of-the-month numerals 1–31, said week disk indicia being in consecutive days of the week for registry with the day-of-the-month numerals, said menstrual cycle disk having legends denoting various periods in a woman's menstrual cycle relatable to said month and said week disks and said cycle disk including indicating means to show the starting point and finish point of a menstrual cycle for registry with any of the day-of-week indicia on said week disk and with any day-of-the-month indicia on said month disk and for showing the periodicity of a cycle, the length of said menstrual cycle between said starting point and said finish point being limited to a 31-day maximum, said week disk indicia having a starting end and finish end, said finish end overlapping said starting end up to 7-day increments totaling a maximum of 38 consecutive weekday markings to cover a 31-day maximum length of said menstrual cycle, said cycle disk and said week disk having a limit-stop arrangement between them limiting their rotational freedom to 6 of said 31 divisions, said week disk indicia being related through said limit stop arrangement to said starting point indicating means on said menstrual cycle disk, whereby any of the seven days of the week at said starting end of said week disk indicia can be indicated by said starting point and one of said weekday indicia being the first weekday in the sequence of consecutive full month weekday indicia, said weekday indicia remaining in a set relationship with said menstrual cycl disk throughout any menstrual cycle up to 31 days, said week disk being assisted by said month disk to provide a legible readout throughout said menstrual cycle, said week disk showing a need for an adjustment of said month disk in relation to said week disk together with said menstrual cycle disk in case a month transition shorter than 31 days occurs within said menstrual cycle, said menstrual cycle disk comprises two relatively movable members with indexing means between them, one of said members having said starting point indicating means and the other of said members having said finish point indicating means together with said indicia pertaining to the events within said menstrual cycle, said indexing means relating to an indexing indicia in a manner such that the maximum indexing readout of 31 will position said starting point and said finish point in line, and any said indexing readout less than 31 reduces the range between said starting and finish points correspondingly, said arrangement forming an adjustable cycle disk indicia readout for a maximum of 31 days.

2. An indicating device comprising relatively rotatable disks, two of which bear calendar day information, and a disk assembly bearing legends pertaining to a woman's menstrual cycle, said disk assembly consisting of a cycle disk and a disk segment rotatably adjustable in relation to said cycle disk, said cycle disk bearing the legends of a fertile period with a 3-day ovulation period and a mark to indicate the start of the next menstrual period, said disk segment having two sectors separated by a radial slot, one of said sectors bearing markings of a five day menstrual period with a pointer on the first day of said menstrual period, the other of said sectors being slightly offset rearwardly so that it can be inserted through a slot in said cycle disk, said disk segment and said cycle disk having cooperating means capable of indexing them in a series of different positions, said cycle disk having a window, said other sector bearing a series of numbers, representing the duration of a menstrual cycle, one of said numbers being visible through said window when said cycle disk and said disk segment are in an indexing position, the relationship between the parts being such that when the highest number is visible through the window said menstrual period and ovulation period will be at a maximum distance apart and when the lowest number appears in the window said menstrual and ovulation period will be at a minimum distance apart.

References Cited

UNITED STATES PATENTS

| | | | |
|---|---|---|---|
| 2,244,514 | 6/1941 | Cwiekalo | 235—88 X |
| 2,385,732 | 9/1945 | Redding. | |
| 2,535,431 | 12/1950 | Lancaster. | |
| 2,542,943 | 2/1951 | Reiner | 235—88 |
| 2,615,631 | 10/1952 | Sorrels | 235—88 |
| 2,792,177 | 5/1957 | Ker | 235—88 |
| 2,808,206 | 10/1957 | Gomez-Rodriguez | 235—88 |
| 3,412,494 | 11/1968 | Vogel | 235—88 X |

LOUIS R. PRINCE, Primary Examiner

D. M. YASICH, Assistant Examiner

U.S. Cl. X.R.

116—133

UNITED STATES PATENT OFFICE
CERTIFICATE OF CORRECTION

Patent No. 3,534,905          Dated October 20, 1970

Inventor(s) LEO KULL

It is certified that error appears in the above-identified patent and that said Letters Patent are hereby corrected as shown below:

SPECIFICATION

Column 2, line 32, "in" should read --- on ---

Column 3, line 23, after "disk" insert --- 14 ---; line 35, "release" should read --- relate ---; line 42, after "ovulation" insert --- is a variable and is determined by the length of the cycle ---; line 74, "used" should read --- reused ---

Column 4, line 8, "of" should read --- in ---; line 18, "exent" should read --- extent ---

Column 3, lines 43-47, "An extended..... length of cycle" should be deleted.

Signed and sealed this 20th day of July 1970.

(SEAL)
Attest:

EDWARD M. FLETCHER, JR.
Attesting Officer

WILLIAM E. SCHUYLER, JR.
Commissioner of Patents